…

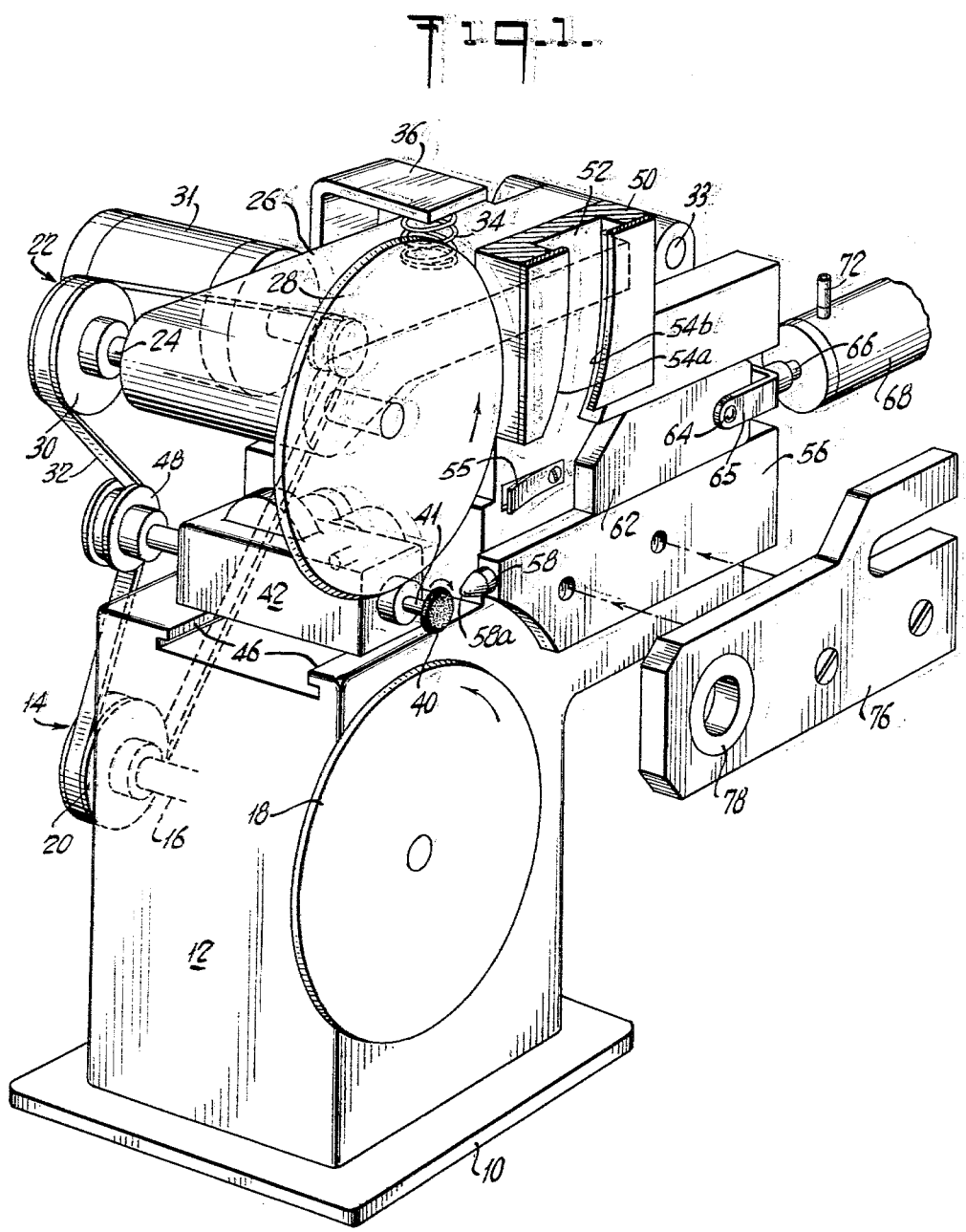

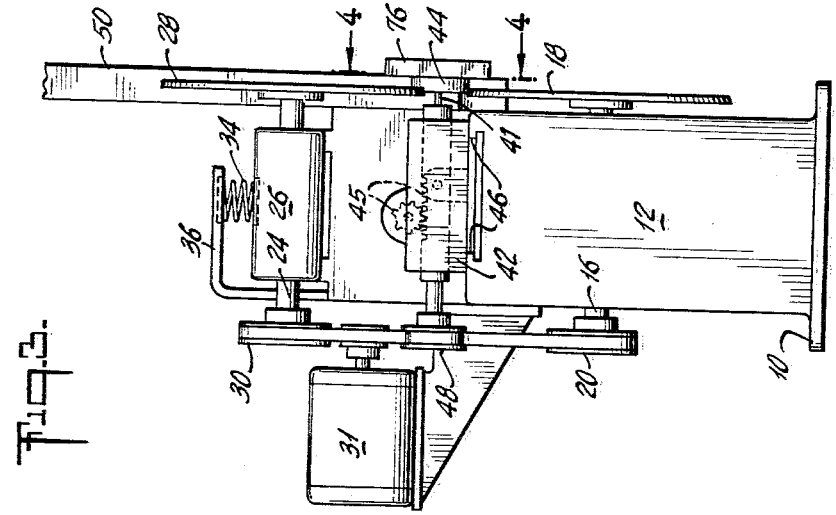
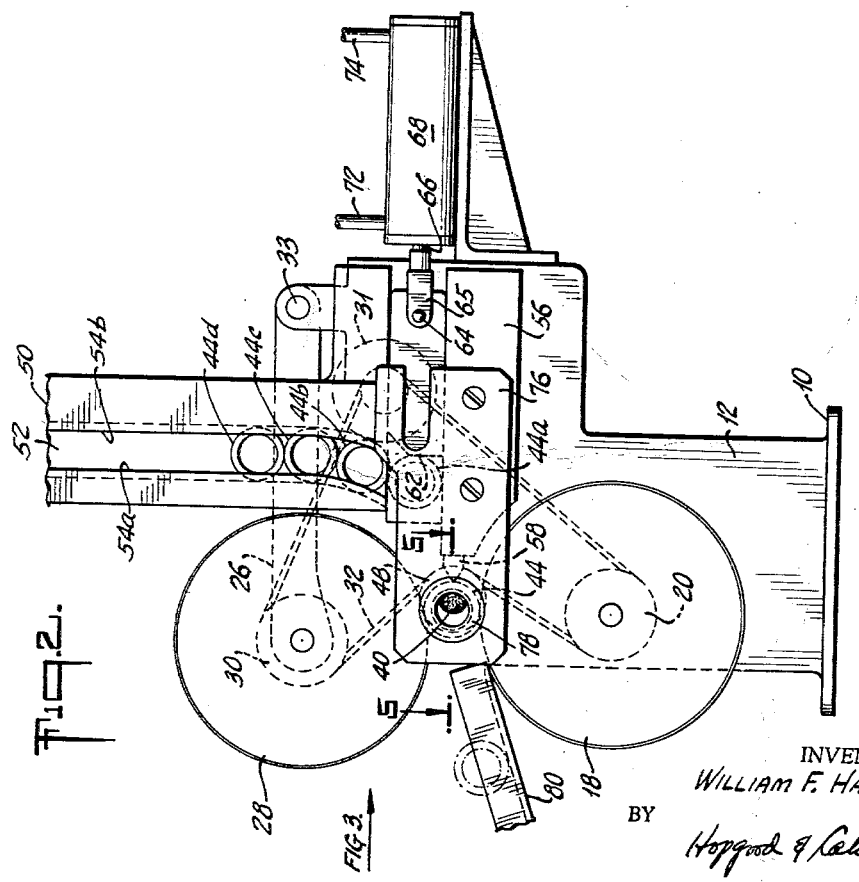

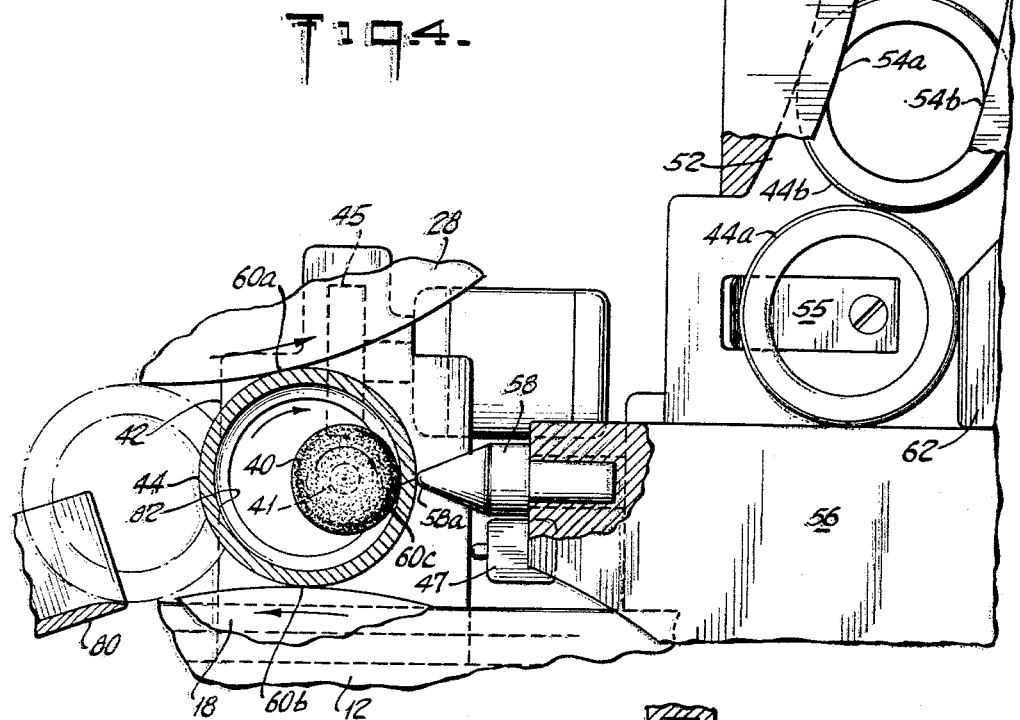

United States Patent Office 3,169,351
Patented Feb. 16, 1965

3,169,351
GRINDING MACHINE
William F. Hannon, Berlin, Conn., assignor to The Fafnir Bearing Company, New Britain, Conn., a corporation of Connecticut
Filed Nov. 27, 1962, Ser. No. 240,259
5 Claims. (Cl. 51—103)

This invention relates to means for guiding a workpiece while machining operations are being carried out on said piece, and particularly to means for guiding such piece while being rotated.

There are a number of applications in which it is desirable to machine a circular member in one manner or another while it is being rotated. An example of one of these applications involves a machine for grinding the internal surface of a workpiece in the form of an outer race ring for a miniature ball bearing assembly. In one such machine, this annular workpiece is located vertically for grinding by the lower one of two driving disc members and is located in a radial horizontal direction by a stationary carbide shoe which has a concave surface formed to receive the outer surface of the workpiece. The upper driving disc is mounted on a movable arm and exerts a downward force to cooperate with the lower disc and the carbide shoe in positioning the workpiece to thereby provide sufficient frictional engagement between the workpiece and the driving discs to rotate the workpiece. The upper and lower discs may be skewed horizontally with respect to each other or their circular peripheral surfaces beveled so as to exert force on the workpiece to hold it against a suitable locating means to provide proper axial location and accurate face control of the workpiece.

The material from which the outer ring is made is a high hardness steel which frictionally engages the concave surface of the carbide shoe as the ring is rotated. At the high production rates used, rapid and uneven wear of the concave surface of the shoe results, causing machining difficulties and defective parts or rejects. The wear is relatively rapid and frequent shoe repair is therefore necessary.

Among the disadvantageous effects produced by the wearing of the shoe is that it gouges the outer surface of the workpiece, and results in a manufactured product which is either out of specification or at best gives the appearance of sloppy workmanship although it may in fact be within specifications. Since the wear of the carbide shoe is quite rapid, it must be frequently removed to restore the original shape and orientation of the concave surface accurately, so that it will produce pieces which are within specification when reinstalled on the machine. This alone is a difficult task due to the hardness of the carbide material, the close tolerances required for the finished outer ring, the nature of the engagement between the workpiece and the shoe, and the very small dimensions involved.

It should also be noted that a carbide shoe defect can best be discovered by sampling the completed parts and therefore frequent sampling from each machine is necessary to prevent the manufacture of large numbers of parts which are out of specification. Additionally the very existence of the need for a resurfacing operation on the shoe presents a further problem in that when the shoe appears to be properly resurfaced and is replaced on the machine, it often happens that the parts then made still do not meet specifications for one reason or another so that further resurfacing is necessary. From the foregoing it will be appreciated that the maintenance time and the machine-down time become substantial, thus enlarging the cost of the machining operation involved.

Accordingly it is an object of this invention to provide a work guiding arrangement in which the machine parts have a substantially longer operating life than the prior art arrangement referred to above.

It is a further object to provide an arrangement for guiding a rotating workpiece to be machined which inherently produces a substantially smaller percentage of defectively machined pieces than prior art arrangements.

All of the objects, features and advantages of this invention and the manner of attaining them will become more apparent and the invention itself will be best understood by reference to the following description of an embodiment of the invention taken in conjunction with the accompanying drawing, in which FIG. 1 is a perspective view illustrating a portion of a grinding machine in which a workpiece is rotatably guided in accordance with the principles of this invention;

FIG. 2 is a side view of the machine and workpiece arrangement of FIG. 1;

FIG. 3 is a front view of the apparatus of FIG. 1;

FIG. 4 is an enlarged side view showing means for rotating and guiding the workpiece, and FIG. 5 is a view looking down on the machine from above and showing parts thereof in cross-section.

Briefly, the invention contemplates apparatus for guiding a workpiece to be machined comprising a first rotary driving member adapted for movement in a first direction of rotation, a second rotary driving member spaced from said first driving member and also adapted for movement in said first direction of rotation, a circular workpiece located between said first and second members and having its curved peripheral surface in contact with the curved outer surfaces of said first and second members to be rotated thereby, the axis of rotation of said workpiece being located to one side of a straight line connecting the axes of rotation of said first and second driving members, and a fixed work-guiding member positioned for continuous engagement with the curved peripheral surface of said workpiece, said work-guiding member having having a hardness greater than the hardness of said workpiece and being formed with a diminished portion for said engagement with said workpiece, whereby said workpiece is smoothly and accurately rotated between said driving members and said fixed work-guiding member.

Referring now to the drawings there is shown a machine for guiding miniature parts including a base plate 10 upon which is secured a mounting block 12. A lower driving roller or disc assembly is mounted in the block 12 for fixed rotation upon a shaft 16, one end of which is secured to a small driving disc 18 which may be for example .032″ thick, the other end being provided with suitable means for producing rotation such as a driving pulley 20. An upper driving roller or disc assembly 22 is also provided and includes a shaft 24 adapted for rotation in a pivotable member 26. One end of the shaft 24 is provided with a small, thin driving disc 28 similar to the driving disc 18, and the other end of this shaft is provided with suitable driving means in the form of a driving pulley 30 similar to the pulley 20. Suitable conventional driving means such as a motor 31 is mounted to drive a belt 32 for rotating the driving discs 18 and 28, and to supply mechanical power to the other parts of the machine.

The member 26 is hinged at one end so as to pivot substantially in a vertical direction about the pin 33, thereby allowing the upper driving disc 28 to be raised and lowered for purposes to become apparent hereinafter. The member 26 is biased in a downward direction by means of a compression spring 34 and a mounting bracket 36, the latter being secured to the block 12.

A small grinding head 40 of suitable abrasive material, such as for example vitrified Alundum, is provided on the end of a shaft 41. The shaft 41 is mounted for rotation in a housing 42 which also includes conventional means for axially moving the shaft 41 to thereby advance the head 40 to a position within the internal space of a miniature annular rotating workpiece 44 and to retract it therefrom in a manner and for purposes as will become clear later in the specification. Such means for advancing and retracting the grinding head 40 may comprise a rack and pinion 45, or other suitable arrangement. The housing 42 is mounted for rectilinear movement along a track 46 in the top of the block 12, and will engage a microswitch 47 upon arrival at a predetermined position, see FIGS. 4 and 5. The rotary power to drive the grinding head 40 is obtained from the pulley 48 through the rack and pinion arrangement 45.

A vertical plate 50 is provided to one side of the upper disc 28 and includes a channel 52 which forms a loading chute, having lips 54a and 54b, for storing a plurality of workpieces 44b, 44c, 44d, etc. In this illustrative embodiment, the workpieces are in the form of ball bearing outer ring blanks stacked vertically upon one another in a position to be released one at a time to be advanced to the work position represented by the location of the workpiece 44. A leaf spring 55 is provided just below the exit end of the loading chute 52.

At some distance beneath the lower portion of the loading chute 52 there is secured a mounting plate 56 which is held in fixed relationship with the vertical plate 50. This mounting plate 56 is provided at its left end with a work-guiding member 58 of extremely hard material for continuous engagement with the workpiece 44. This member 58 is preferably a polished diamond having a diminished end portion 58a for engagement with the circular outer surface of the workpiece 44. The diminished end portion 58a may take the form of a rounded or conical end with a radius for example of 1/32" for use with parts of miniature size in the particular embodiment described. The diamond 58 may be fixed in place on the mounting plate 56 by means of soft solder or other suitable fastening means.

The space between the lower edge of the vertical plate 50 and the top surface of the mounting plate 56 defines a space or slot which is adapted to slidably receive a loading blade 62. This loading blade 62 is connected by means of a pin 64, a yoke 65, and a connecting rod 66 to a two-way air cylinder 68 for actuating the loading blade in two directions of movement to receive blanks 44a, 44b, 44c, 44d, etc. one at a time and position them in sequence in the work position indicated by the location of the workpiece 44. Suitable air lines 72 and 74, are connected to opposite ends of the cylinder 68 so that actuation of the loading blade 62 can be accomplished as desired.

An outer plate 76 is screwed into overlying relationship with the mounting plate 56 and the lower portion of the vertical plate 50 and serves to prevent any sidewise movement of the loading blade 62. The outer plate 76 is also provided with a carbide ring 78 suitably secured thereto and positioned so that one side of the ring is in the plane of the inner side of the outer plate. This arrangement provides an accurately machined high hardness planar work locating surface against which one face of the workpiece 44 may ride as it is being rotated. A receiving chute 80 is provided to one side of the workpiece 44, see FIGS. 2 and 4, for receiving workpieces 44 after they are machined.

When a workpiece 44 is in the position shown between the discs 18 and 28, the biasing spring 34 with the weight of the upper driving roller assembly 22 and the member 26, produces a generally downward force on the workpiece. Since the center of the workpiece 44 is located somewhat to the right of a line between the axes of rotation of the discs 18 and 28, see FIGS. 2 and 4, this downward force will result in a force component to the right, thus urging the workpiece against the diminished end portion 58a of the work-guiding member 58. The workpiece 44 is thus constrained in the position shown by the application of forces at the three points 60a, 60b and 60c in FIG. 4 and due to the forces between it and the frictional driving discs, the piece is rotated by the discs, both of which are positively driven by the motor 31. In the embodiment shown, the discs 18 and 28 are both driven in a counterclockwise direction and the workpiece 44 is therefore driven in a clockwise direction. The peripheral edges of the driving discs 18 and 28 are beveled as can be seen in FIG. 3 and ride on the left edge of the workpiece 44. This produces on the workpiece 44 an axial component of force toward the right in FIG. 3, thereby continuously urging the workpiece against the carbide ring 78 as the piece is rotated. The same result can also be achieved by skewing the shafts 16 and 24 slightly with respect to each other instead of providing beveled edges on the discs 18 and 28.

As the workpiece 44 is rotated by the discs 18 and 28 in the clockwise direction the grinding head 40 is also rotated in the clockwise direction and is urged by suitable conventional means, such as an air cylinder, against the inside of the workpiece to thereby accurately grind or machine an annular groove 82 into the internal surface of the workpiece as clearly seen in FIG. 5. When the groove has been ground to the desired depth in accordance with a predetermined setting or location of the microswitch 47, a suitable air cylinder will move the housing 42 along the track 46 in a direction away from the microswitch 47 so that the rack and pinion may be actuated, also by an air cylinder, to retract the grinding head 40 from its position within the workpiece 44. Air pressure is then supplied to the line 74 to cause the cylinder 68 to advance the loading blade 62. This will advance the next workpiece 44a, which is already in position in front of the loading blade 62, in the direction of the upper rotating disc 28.

Continued advance of the workpiece 44a by the loading plate 62 will raise the upper disc 28 against the pressure of the spring 34, and will also cause ejection of the completed workpiece 44 into the receiving chute 80. The new workpiece 44a will then be in the position previously occupied by the workpiece 44 and will be restrained from also entering the receiving chute 80 by the downward movement of the upper disc 28. The new workpiece 44a will then be rotated, the grinding head 40 will be advanced into the internal space of this workpiece and air pressure as before will be applied to the housing 42 to thereby urge it along the track 46 so that a raceway may be ground in the new piece 44a. Meanwhile air is also supplied to the line 72 to cause the cylinder 68 to retract the loading blade 62. When the loading blade has been fully retracted, another workpiece 44b drops down from the loading chute 52 into the position previously occupied by the workpiece 44a in FIG. 2, ready to be advanced when the loading blade 62 is actuated after the second workpiece 44a now being machined is finished. The leaf spring 55 prevents the workpiece in front of the loading blade 62 from accidentally drifting into contact with the upper rotating disc 28 while it is stored in this position.

This invention has filled a long felt need in the art for an improved arrangement for guiding miniature ball bearing outer rings as an internal race is being ground therein and the teaching herein results in numerous important advantages. One of the most important of these is that the reject percentage of parts machined is greatly improved since the accuracy of machining or grinding is superior to the prior art arrangements in several ways. First, the internal groove is more accurately aligned with respect to the body of the ring because the work-guiding diamond 58 has substantially point contact with the ring 44, whereas the curvature of the carbide shoe arrangement previously employed would tend to contact one side of the outer surface of the ring and thus misalign it from its proper position. Secondly a better internal race groove roundness is produced by the present arrangement. One reason for this may be that the concave mating surface of the prior carbide shoe scheme produces more friction and erratic rotation of the workpiece than the diamond guide employed herein. Further, absolutely no gouging of the ring outer surfaces is produced by the diamond whereas this was a serious problem with the prior device.

A still further advantage of great importance is that the wear characteristics of the arrangement taught herein are highly superior. Specifically the life of the carbide shoe was approximately one week or less after which it would have to be repaired or discarded. The present point contact arrangement produces parts continuously within specification for periods of the order of three months. Consequently, not only is the reject percentage a mere fraction of that previously encountered, but also the maintenance cost and machine-down time or lost production time are proportionately reduced.

Yet another advantage is that a single diamond can be employed with workpieces of different diameters whereas with the carbide shoe arrangement, a differnt shoe would have to be accurately positioned on the machine whenever a group of different diameter workpieces were to be machined. The present arrangement has a still further cost advantage since the diamond work guide costs only about 30% of the cost of the carbide shoe.

It should also be noted that the production of miniature quality parts to which this invention is primarily applicable is relatively expensive, so that a substantial overall cost reduction is realized by reason of the device taught herein.

While the foregoing description sets forth the principles if the invention in connection with specific apparatus, it is to be understood that the description is made only by way of example and not as a limitation of the scope of the invention as set forth in the objects thereof and in the accompanying claims.

What is claimed is:

1. Apparatus for guiding a circular workpiece to be machined comprising
    a first rotary driving member adapted for movement in a first direction of rotation,
    a second rotary driving member spaced from said first driving member and also adapted for movement in said first direction of rotation,
    said circular workpiece being located between said first and second members and having its curved peripheral surface in contact with the curved outer surfaces of said first and second members to be rotated thereby,
    the axis of rotation of said workpiece being located to one side of a straight line connecting the axes of rotation of said first and second driving members,
    and a fixed work-guiding member positioned for continuous engagement with the curved peripheral surface of said workpiece,
    said work-guiding member having a hardness greater than the hardness of said workpiece and being formed with a diminished end portion for said engagement with said workpiece, said work-guiding member consisting of a diamond and having said diminished end portion polished to provide a smooth rounded surface for substantially point contact with said workpiece, whereby said workpiece is smoothly and accurately rotated between said driving members and said fixed work-guiding member.

2. The apparatus described in claim 1 which further includes means for urging one of said driving members into pressure contact with said workpiece.

3. Apparatus for guiding an annular workpiece to be machined comprising
    a first rotary driving disc adapted for rotation in a counterclockwise direction,
    a second rotary driving disc in substantially planar alignment with and spaced from said first driving disc and also adapted for rotation in said counterclockwise direction,
    the outer edges of said discs being in non-parallel relationship with each other in the region where said edges face each other,
    a planar work locating member,
    said annular workpiece being located in contact with said first and second driving discs to be rotated thereby and having one face thereof in engagement with said planar work locating member,
    the axis of rotation of said workpiece being located to one side of a straight line connecting the axes of rotation of said first and second driving discs,
    and a fixed work-guiding member positioned for continuous engagement with the outer circular surface of said workpiece,
    said work-guiding member consisting of a diamond formed with a polished curved surface of small radius for said engagement with said workpiece,
    and biasing means for urging one of said discs into pressure contact with said workpiece,
    whereby said workpiece is rotated between said driving discs and said work-guiding member and simultaneously urged against said planar work-locating member as a result the engagement of said non-parallel edges of said discs with said workpiece.

4. The apparatus described in claim 3 which further includes grinding means adapted to be positioned within said annular workpiece substantially opposite said work-guiding member to thereby machine an annular groove in the internal surface of said workpiece as it is rotated.

5. Apparatus for guiding an annular bearing ring to be machined comprising
    a first rotary driving disc rotatable in a first direction of rotation,
    a secondary rotary driving disc spaced from said first driving disc and also rotatable in said first direction,
    the outer edges of said discs facing one another in non-parallel relationship at the point of closest proximity to one another,
    a work locating member,
    said bearing ring being located in contact with the edges of said first and second driving discs to be rotated thereby and having one face thereof in engagement with said work locating member,
    the axis of rotation of said bearing ring being located to one side of a straight line connecting the axes of rotation of said first and second driving discs,
    and a fixed work-guiding member for continuous point contact engagement with the outer circular surface of said bearing ring, said fixed work-guiding member being positioned on the same side of said straight line as the axis of rotation of said bearing ring,
    said work-guiding member consisting of a diamond formed with an end having a polished curved surface of small radius for said engagement with said bearing ring,
    and biasing means for urging the edges of said discs into pressure contact with said bearing ring,
    whereby said bearing ring is rotated between said driving discs and said work-guiding member and simultaneously urged against said work-locating member as a result the engagement of said non-parallel edges of said discs with said bearing ring.

References Cited in the file of this patent

UNITED STATES PATENTS

| | | |
|---|---|---|
| 2,706,369 | Dix | Apr. 19, 1955 |
| 3,023,552 | Grobey et al. | Mar. 6, 1962 |